United States Patent [19]

Kusaka et al.

[11] 4,405,220
[45] Sep. 20, 1983

[54] AUTOMATIC FOCUSING APPARATUS FOR A CAMERA

[75] Inventors: Yosuke Kusaka, Kawasaki; Nobuo Okabe, Tokyo, both of Japan

[73] Assignee: Nippon Kogaku K.K., Tokyo, Japan

[21] Appl. No.: 316,440

[22] Filed: Oct. 29, 1981

[30] Foreign Application Priority Data

Nov. 7, 1980 [JP] Japan .................................. 55-156574

[51] Int. Cl.³ .............................................. G03B 3/10
[52] U.S. Cl. .................................................... 354/25
[58] Field of Search .......................... 354/25, 195, 198; 352/140

[56] References Cited

U.S. PATENT DOCUMENTS 4,264,810  4/1981  Utagawa et al. ..................... 250/204
4,324,465  4/1982  Rossbach et al. ..................... 354/25

*Primary Examiner*—Michael L. Gellner
*Attorney, Agent, or Firm*—Shapiro and Shapiro

[57] ABSTRACT

An automatic focusing apparatus for a camera includes object brightness detecting means for detecting the brightness of an object and producing an output corresponding to the brightness, in-focus detecting means for detecting whether the phototaking lens of the camera lies within or outside a predetermined in-focus range near the in-focus point and producing outputs corresponding to the respective cases, and phototaking lens driving means for driving the phototaking lens to its in-focus position in accordance with the output of the object brightness detecting means and the output of the in-focus detecting means.

4 Claims, 5 Drawing Figures

AUTOMATIC FOCUSING APPARATUS FOR A CAMERA

BACKGROUND OF THE INVENTION

1. Field of the Invention

This invention relates to an automatic focusing apparatus for a camera which meters an object light and automatically focuses a phototaking lens on the basis of the metering output, and more particularly to an automatic focusing apparatus suitable for use in a single lens reflex camera which meters the light passed through the phototaking lens and effects focus detection.

2. Description of the Prior Art

In an automatic focusing apparatus for a camera, there are two great desires to enhance the focusing accuracy and to increase the driving speed of the phototaking lens and quicken the focusing operation. In order to meet these desires, it has heretofore been proposed to decrease the driving speed of the phototaking lens when it lies within a predetermined in-focus range in the vicinity of the in-focus point and to increase the driving speed of the phototaking lens when it lies outside the predetermined in-focus range. However, it is not sufficient to vary the lens driving speed simply depending on whether the phototaking lens is within or outside the predetermined in-focus range. That is, where focusing operation is effected by metering an object light, if the object brightness is low, the responsiveness of the circuit is reduced and therefore, in such case, there occurs the necessity of decreasing the lens driving speed to obtain high focusing accuracy.

SUMMARY OF THE INVENTION

It is therefore an object of the present invention to provide an automatic focusing apparatus for a camera which controls the lens driving speed by taking into account whether the phototaking lens is within or outside the predetermined in-focus range and the object brightness.

The invention will become fully apparent from the following detailed description thereof taken in conjunction with the accompanying drawings.

DESCRIPTION OF THE PREFERRED EMBODIMENT

An embodiment of the present invention will hereinafter be described by reference to the drawings.

Figure 1:
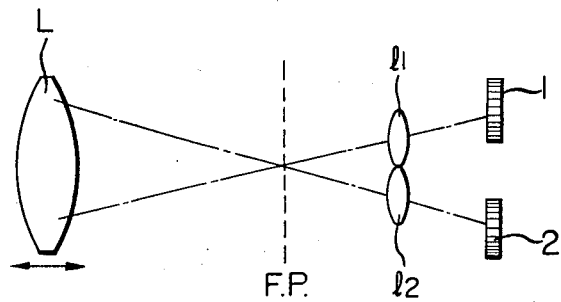
FIG. 1 shows the optical system of an automatic focusing camera.

FIG. 1 shows an example of the optical system of an automatic focusing camera.

A pair of first and second image re-forming lenses $l_1$ and $l_2$ are disposed rearwardly of the predetermined focal plane FP of a phototaking lens L, and these image re-forming lenses $l_1$ and $l_2$ cause a light beam passed through the marginal portion of the phototaking lens L to be imaged in the vicinity of first and second photoelectric element arrays 1 and 2 corresponding to the lenses $l_1$ and $l_2$, respectively. In such an optical system, as fully described in U.S. application Ser. No. 112,350, the optical images on the first and second photoelectric element arrays 1 and 2 are displaced in the direction of arrangement of the elements of the photoelectric element arrays which is substantially perpendicular to the optical axes of the image re-forming lenses $l_1$ and $l_2$, in accordance with the distance between an object to be photographed and the phototaking lens.

Figure 2:
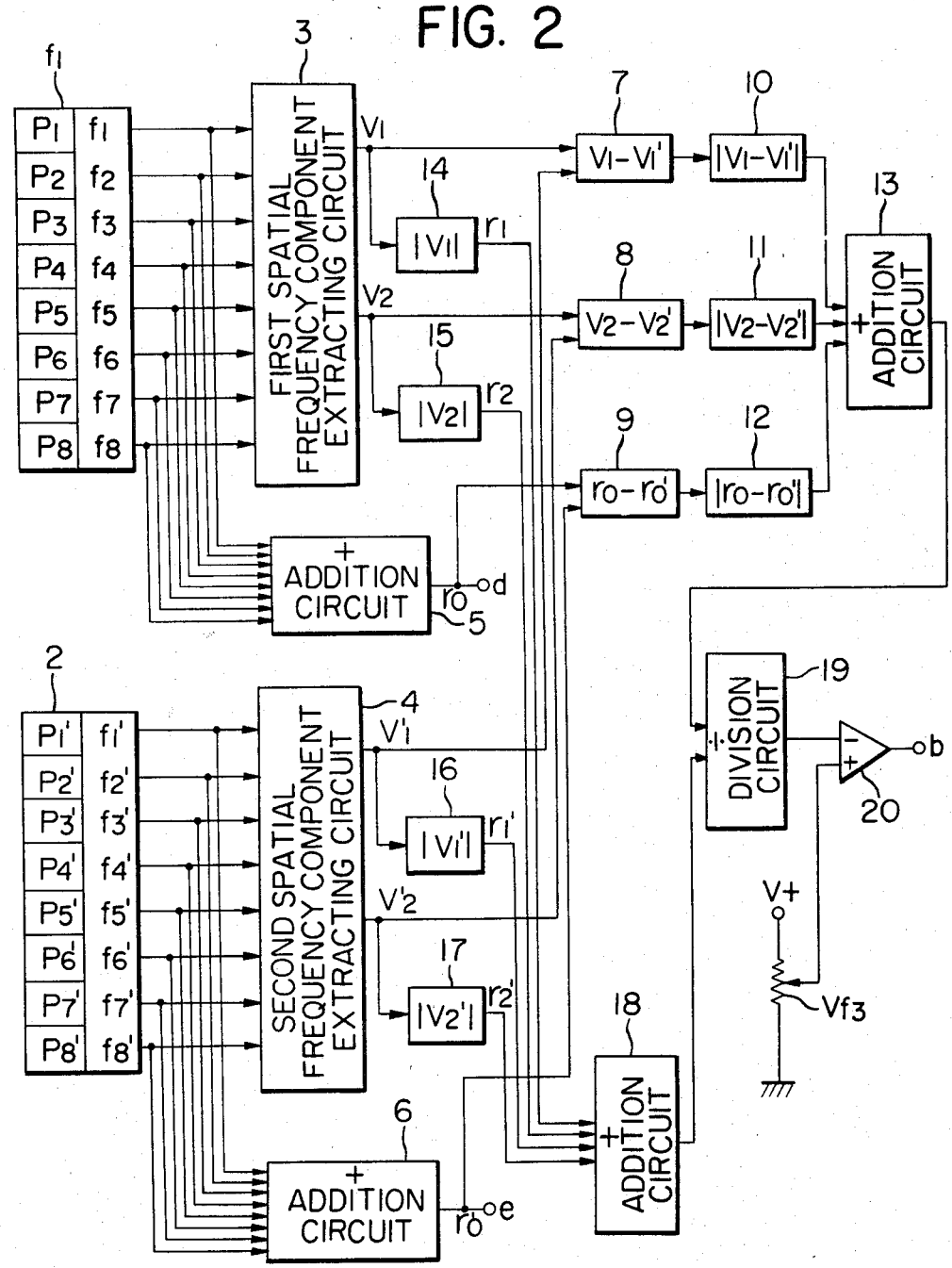
FIG. 2 is a circuit diagram of an in-focus detecting device which is a part of an embodiment of the automatic focusing apparatus according to the present invention.

FIG. 2 shows an in-focus detecting apparatus for detecting from the outputs of the first and second photoelectric element arrays whether the phototaking lens lies within or outside a predetermined in-focus range near the in-focus position.

The first and second photoelectric element arrays 1 and 2 comprise a plurality of photoelectric elements $P_1-P_8$ and $P_1'-P_8'$, respectively. Outputs $f_1-f_8$ associated with the photoelectric outputs of the photoelectric elements $P_1-P_8$ and outputs $f_1'-f_8'$ associated with the photoelectric outputs of the photoelectric elements $P_1'-P_8'$ are applied as inputs to first and second spatial frequency component extracting circuits 3 and 4, respectively. The first spatial frequency component extracting circuit 3 outputs a first electrical signal $V_1$ containing much of the information of a first spatial frequency component of the optical image on the first photoelectric element array 1 and a second electrical signal $V_2$ containing much of the information of a second spatial frequency component of the optical image, the second spatial frequency component being different from the first spatial frequency component. The second spatial frequency component extracting circuit 4 likewise outputs first and second electrical signals $V_1'$ and $V_2'$ respectively containing much of the information of a first spatial frequency component of the optical image on the second photoelectric element array 2 and much of the information of a second spatial frequency component. The first and second spatial frequency component of the optical image on the second array 2 are the same as the first and second spatial frequency components of the optical image on the first array 1, respectively. Specific details of such first and second spatial frequency component extracting circuits 3 and 4 are disclosed in the aforementioned U.S. application Ser. No. 112,350.

The first electrical signals $V_1$ and $V_1'$ are vector amounts such as sine wave signals containing phase information $\phi_1$ and $\phi_1'$ which, when the optical images on the photoelectric element arrays 1 and 2 are displaced in the direction of arrangement of the photoelectric elements thereof, vary in a predetermined relation in accordance with the displacement, and information $r_1$ and $r_1'$ representative of the magnitudes of the extracted spatial frequency components thereof.

The second electrical signals $V_2$ and $V_2'$ likewise are vector amounts containing phase information $\phi_2$ and $\phi_2'$ and magnitude information $r_2$ and $r_2'$.

Addition circuits 5 and 6 add together associated electrical outputs $f_1-f_8$ and $f_1'-f_8'$, respectively, and output at terminals d and e scalar outputs $r_0$ and $r_0'$ representative of the total quantity of incident light.

Subtraction circuits 7, 8 and 9 respectively calculate the difference between the first electrical signals $V_1$ and $V_1'$ representative of the first spatial frequency components, the difference between the second electrical signals $V_2$ and $V_2'$ representative of the second spatial frequency components, and the difference between the scalar outputs $r_0$ and $r_0'$. Absolute value circuits 10, 11 and 12 respectively obtain the absolute values of the outputs $V_1-V_1'$, $V_2-V_2'$ and $r_0-r_0'$ of the subtraction circuits 7, 8 and 9, namely, the magnitudes $|V_1-V_1'|$ and $|V_2-V_2'|$ of the vectors thereof, and the absolute value $|r_0-r_0'|$ of the scalar output $r_0-r_0'$. An addition circuit 13 adds together the outputs of the absolute value circuits 10, 11 and 12 and produces an output $|V_1-V_1'|+|V_2-V_2'|+|r_0-r_0'|$. On the other hand, absolute value circuits 14, 15, 16 and 17 respectively obtain the absolute values of the first and second electrical signal outputs $V_1$, $V_2$, $V_1'$, and $V_2'$, namely, the magnitudes $|V_1|=r_1$, $|V_2|=r_2$, $|V_1'|=r_1'$ and $|V_2'|=r_2'$ of the vectors. An addition circuit 18 adds together the outputs $r_1, r_2, r_1'$ and $r_2'$ of the absolute value circuits 14-17.

The outputs $|V_1-V_1'|$, $|V_2-V_2'|$ and $|r_0-r_0'|$ of the absolute value circuits 10-12 have a correlation with the deviation of the phototaking lens from its in-focus position such that they become smallest (ideally zero) when the phototaking lens is at its in-focus position and that they become greater as the phototaking lens is deviated from its in-focus position. These outputs are also dependent on the contrast of the optical image. Accordingly, the output of the addition circuit 13 also has the above-described correlation and is dependent on the contrast of the optical image.

On the other hand, the outputs $r_1, r_1', r_2$ and $r_2'$ are also dependent on the contrast of the optical image, substantially similarly to the outputs $|V_1-V_1'|$, $|V_2-V_2'|$ and $|r_0-r_0'|$. Accordingly, the outputs of the addition circuit 18 is also dependent on the contrast of the optical image. A division circuit 19 divides the output of the addition circuit 13 by the output of the addition circuit 18. In other words, it divides the output $|V_1-V_1'|+|V_2-V_2'|+|r_0-r_0'|$ by the output $(r_1+r_2+r_1'+r_2')$. The output of the division circuit 19 is hardly dependent on the contrast of the optical image and is dependent only on the amount of deviation of the phototaking lens from its in-focus position. A comparison circuit 20 compares the output level of the division circuit 19 with a reference level $V_{f3}$ and generates a high level output when the output level of the division circuit 19 is smaller, namely, when the phototaking lens lies within a predetermined in-focus range near the in-focus position, and produces a low level output when the output level of the division circuit 19 is greater, namely, when the phototaking lens lies outside the predetermined in-focus range.

In this manner, the above-described in-focus detecting apparatus produces an Hi-level output as the within-the-predetermined-in-focus-range signal at the output terminal b of the comparison circuit 20 when the phototaking lens L lies within the predetermined in-focus range near the in-focus position, and produces an Lo-level output as the outside-the-predetermined-in-focus-range signal at the output terminal b when the phototaking lens L lies outside the predetermined in-focus range.

Figure 3:
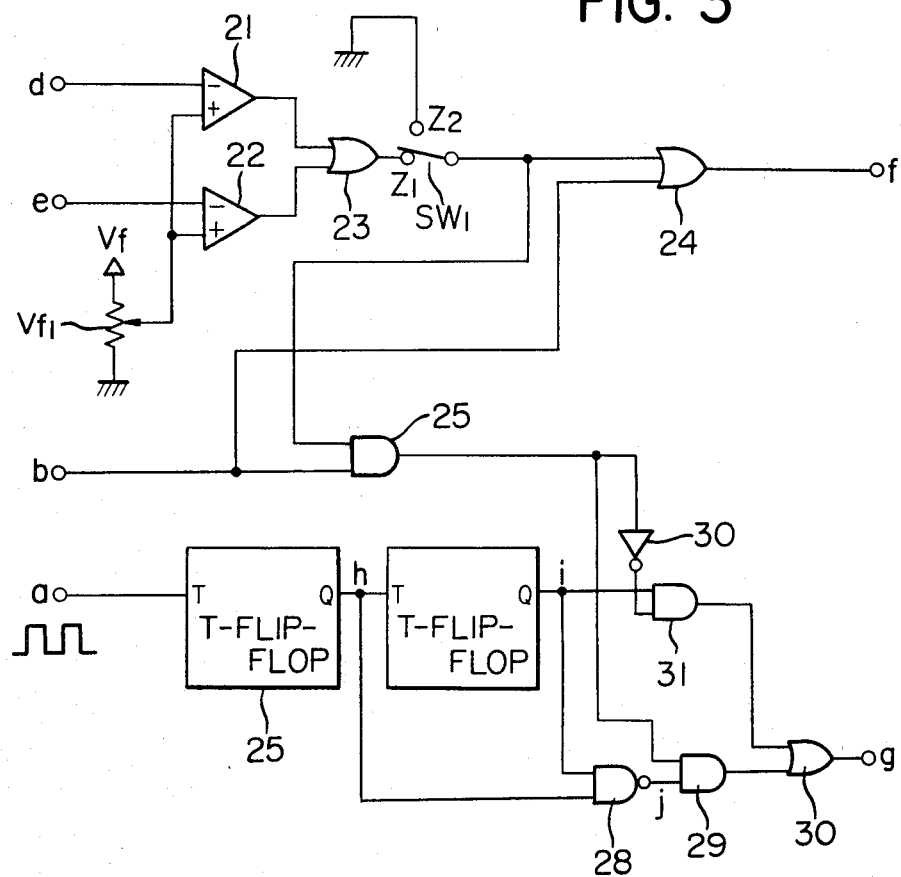
FIG. 3 is a circuit diagram of a device for preparing a signal for controlling the phototaking lens driving speed, which device is a part of the embodiment.

FIG. 3 shows a circuit to which each output of the in-focus detecting apparatus of FIG. 2 is applied as input and which then prepares a signal for controlling the driving speed of the phototaking lens. In FIG. 3, input terminals b, e and d are connected to the output terminals b, e and d, respectively, of FIG. 2.

The scalar outputs $r_0$ and $r_0'$ representative of the total quantities of light of the object images on the photoelectric element arrays 1 and 2 of the in-focus detecting apparatus shown in FIG. 2 are applied as inputs to terminals d and e, respectively. Comparators 21 and 22 compare these signals $r_0, r_0'$ with a reference voltage $V_{f1}$ and applies a Hi-level output to an OR gate 23 when the scalar outputs $r_0$ and $r_0'$ are lower than the voltage $V_{f1}$, and applies a Lo-level output to the OR gate 23 when the scalar outputs $r_0$ and $r_0'$ are higher than the voltage $V_{f1}$. Accordingly, the OR gate 23 produces a Hi output when one or both of the scalar outputs $r_0$ and $r_0'$ are below the reference voltage $V_{f1}$, namely, when the object image has become dark, and produces a Lo output during the other time, namely, when the object image bright. A Hi-level within-the-predetermined-in-focus-range signal or a Lo-level outside-the-predetermined-in-focus-range signal is applied as input to the terminal b. The signal of this terminal b and the output of the OR gate 23 are applied to an OR gate 24 and, when one or both of them are Hi-level, namely, when the object image is dark, and/or when the phototaking lens lies within the predetermined in-focus range, the OR gate 24 produces a Hi-level signal at a terminal f, and during the other time, the OR gate 24 generates a Lo-level signal at the terminal f.

On the other hand, the signal of the terminal b and the output of the OR gate 23 are applied to an AND gate 25 and, when both of them are Hi-level, namely, when the object image is dark and the phototaking lens lies within the predetermined in-focus range, the AND gate 25 produces a Hi-level output and during the other time, the AND gate 25 produces a Lo-level output. Clock pulse is applied as input to the terminal a and this pulse is shaped into a pulse h of duty ratio 50% by a T-flip-flop 26 and this pulse is further shaped into a pulse i of duty ratio 50% and having a period twice as great at that of the pulse h. Duty ratio represents ratio of pulse width to pulse period, namely (pulse/width)/(pulse period). A NAND gate 28 receives the pulses h and i as inputs and produces a pulse j of duty ratio 75% and having the same period as that of the pulse i. An AND gate 29 receives as inputs the output i of the NAND gate 28 and the output of the AND gate 25, an AND gate 31 receives as inputs the output of the AND gate 25 inverted by an inverter 30 and the output i of a T-flip-flop 27, and an OR gate 32 receives the outputs of the AND gates 29 and 31 as inputs.

(i) when the object image is dark and the phototaking lens lies within the predetermined in-focus range: In this case, the AND gate 25 applies a Hi-level output to the AND gate 29 and therefore, the AND gate 29 transmits the duty ratio 75% pulse of the NAND gate 28 to the OR gate 32. On the other hand, the Hi-level output of the AND gate 25 is inverted into a Lo-level output by the inverter 30 and applied to the AND gate 31 and therefore, the output of the AND gate 31 always becomes Lo. Accordingly, the duty 75% pulse j of the NAND gate 28 is produced to a terminal g through the OR gate 32 and the AND gate 29.

(ii) When the object image is bright and/or when the phototaking lens lies outside the predetermined in-focus range: In this case, the AND gate 25 applies a Lo-level output to the AND gate 29 to render the output of this gate 29 always Lo-level. On the other hand, the Lo-level output of the AND gate 25 is inverted into Hi by the inverter 30 and applied to the AND gate 31 and therefore, the AND gate 31 transmits the duty ratio 50% pulse i of the T-flip-flop 27 to the OR gate 32.

Accordingly, the duty ratio 50% pulse i of the flip-flop 27 is generated at the terminal g.

The foregoing description has been made with respect to a case where the contact piece of a switch $SW_1$ is in contact with a contact $Z_1$, as shown in FIG. 3. However, the switch $SW_1$ is manually changeable over and when this switch is changed over so that the contact piece thereof comes into contact with a grounded contact $Z_2$, the output of the OR gate 23 based on the scalar outputs $r_0$ and $r_0'$ representative of the total quantities of light of the object image applied to the terminals d and e is cut off and therefore, the focusing speed control comes to be effected independently of the brightness of the object.

Description will now be made of a focus detecting device for detecting whether the phototaking lens lies forwardly of its in-focus position, namely, on the object side (this is called the front focus) or rearwardly of its in-focus position (this is called the rear focus).

Figure 4:
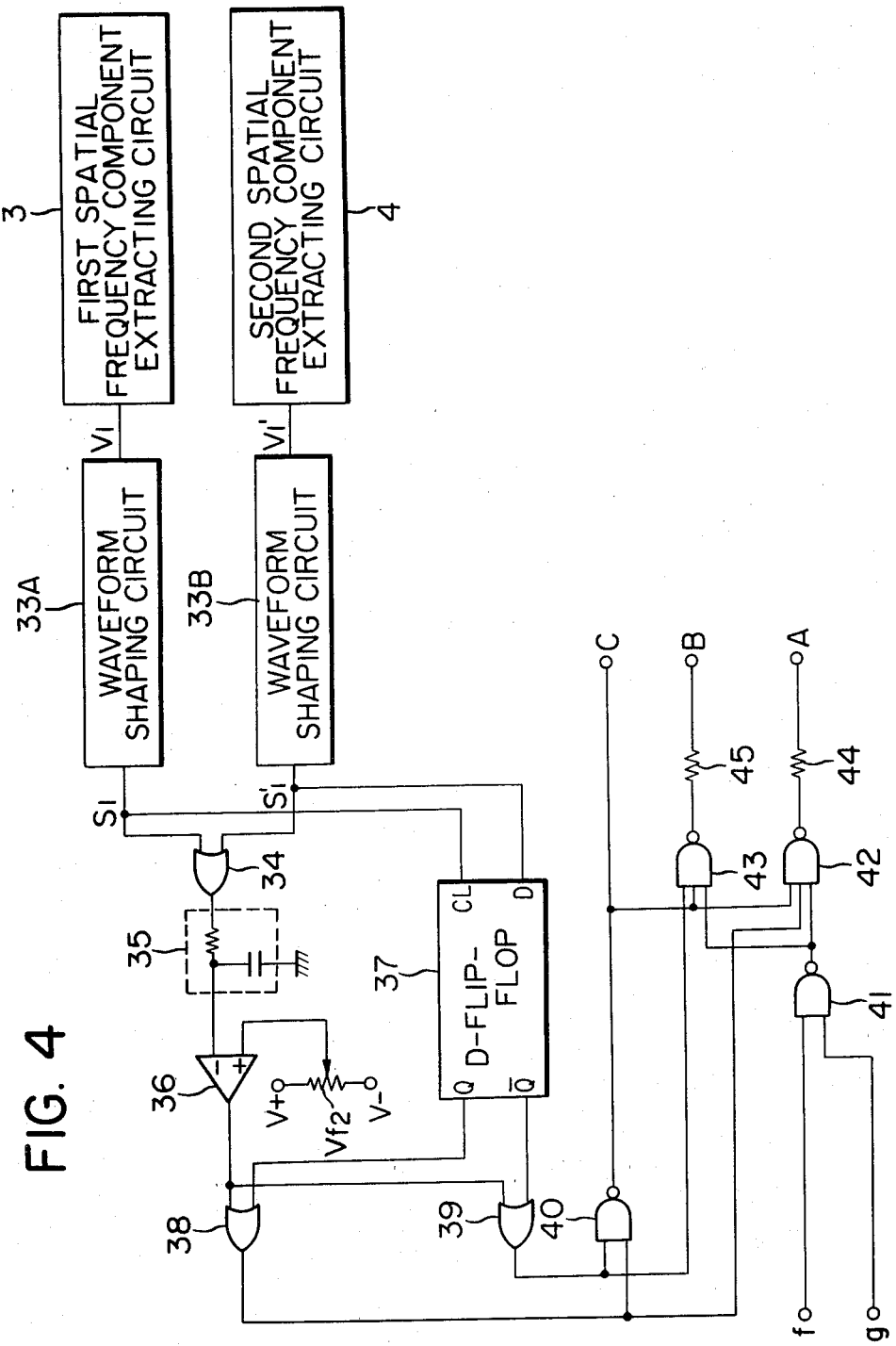
FIG. 4 is a circuit diagram of a focus detecting apparatus which is a part of the embodiment.

In FIG. 4, the sine wave signals $V_1$ and $V_1'$ of the same period from the spatial frequency component extracting circuits 3 and 4 are converted into rectangular waves $S_1$ and $S_1'$ by waveform shaping circuits 33A and 33B, respectively. Of course, $V_2$ and $V_2'$ may be used in place of these sine wave signals $V_1$ and $V_1'$.

When the rectangular wave signal $S_1$ is advanced in phase with respect to the signal $S_1'$, it represent the front focus; when the rectangular wave signal $S_1$ is delayed in phase with respect to the signal $S_1'$, it represents the rear focus; and when the rectangular wave signal $S_1$ is substantially in phase with the signal $S_1'$, it represents the in-focus, and the absolute value of the phase difference between the two signals represents the amount of deviation from the in-focus. An OR gate 34 and a smoothing circuit 35 for smoothing the output of the gate 34 produce a DC output corresponding to the phase difference between the signals $S_1$ and $S_1'$. A comparator 36 compares this DC output level with a reference level $V_{f2}$ and produces a high level output representative of the in-focus when the former is smaller than the latter. A D-flip-flop 37 detects which of the phases of the signals $S_1$ and $S_1'$ is advanced. Assuming that this flip-flop 37 latches the condition of the signal $S_1'$ to D input terminal at the rising of the signal $S_1$ to CL input terminal, the high level of Q output terminal represents the front focus and the high level of $\overline{Q}$ output terminal represents the rear focus. Accordingly, when the output level of the comparator 36 is High, namely, in the case of in-focus, the outputs of OR gate 38 and 39 both assume High level. When the output level of the comparator 36 is Low, namely, in the case of out-of-focus, and if the phototaking lens is in the front focus condition, the output level of the OR gate 38 is High and the output level of the OR gate 39 becomes Low. Conversely, when the phototaking lens is not in focus in the rear focus condition, the output level of the OR gate 38 becomes Low and the output level of the OR gate 39 becomes High. The output signal of a NAND gate 40 which receives the outputs of both OR gates 38 and 39 as inputs becomes Low only in the case of in-focus and is delivered to the brake signal terminal C of a motor for driving the phototaking lens. The above-described circuits 3, 4, 33A, 33B and 34–40 together constitute the focus detecting apparatus.

A signal which assumes Low level when the phototaking lens lies outside the predetermined in-focus range and the object image is bright and assumes High level during the other time is applied as input to the input terminal f from the circuit shown in FIG. 3. Also, clock pulse of duty ratio 75% is applied as input to the input terminal g when the phototaking lens lies within the predetermined in-focus range and the object image is dark, and clock pulse of duty ratio 50% is applied as input to the input terminal g during the other time.

Accordingly, a NAND gate 41 produces a pulse signal of duty ratio 25% when the phototaking lens lies within the predetermined in-focus range and the object image is dark, produces a continuous High level signal when the phototaking lens lies outside the predetermined in-focus range and the object image is bright and produces clock pulse of duty ratio 50% during the other time. A NAND gate 42 receives as inputs the output of the NAND gate 40, the output of the OR gate 38 and the output of the NAND gate 41, and a NAND gate 43 receives as inputs the output of the NAND gate 40, the output of the OR gate 39 and the output of the NAND gate 41. The outputs of the NAND gates 42 and 43 appear at output terminals A and B, respectively, through resistors 44 and 45, respectively.

Thus, when the phototaking lens is in focus, the NAND gate 40 produces a Low level signal to an output terminal C and at this time, output terminals A and B are both at High level.

In the case of the front focus, the output of the NAND gate 41 is transmitted to the terminal A through the NAND gate 42. That is, a pulse signal of duty ratio 75% is produced at the output terminal A when the phototaking lens lies within the predetermined in-focus range and the object is dark, a continuous Low level signal is produced at the output terminal A when the phototaking lens lies outside the predetermined in-focus range and the object is bright, and a pulse signal of duty ratio 50% is produced at the output terminal A during the other time. The output terminals B and C are both at High level.

In the case of the rear focus, the output of the NAND gate 41 is transmitted to the terminal B through the NAND gate 43. That is, just similarly to the case of the front focus, signals corresponding to the phototaking lens being within and outside the predetermined in-focus range and to the object being bright and dark are produced at the output terminal B. At this case, the output terminals A and C are both at High level.

The relations between the above-described outputs of the terminals A, B and C will be shown in Table 1 below.

TABLE 1

| Terminals | Object | Front-focus Outside predetermined in-focus range | In-focus Within predetermined in-focus range | | Rear focus Outside predetermined in-focus range |
|---|---|---|---|---|---|
| A | Bright | Low | Duty ratio 50% pulse | High High | High |
|  | Dark | Duty ratio 50% pulse | Duty ratio 75% pulse | High High | High |
| B | Bright | High | High | High Duty ratio 50% pulse | Low |
|  | Dark | High | High | High Duty ratio | Duty ratio 50% pulse |

TABLE 1-continued

| Ter-minals | Object | Front-focus Outside predetermined in-focus range | In-focus Within predetermined in-focus range | | Rear focus Outside predetermined in-focus range |
|---|---|---|---|---|---|
| C | Bright | High | High | Low | 75% pulse High | High |
|  | Dark | High | High | Low | High | High |

Figure 5:
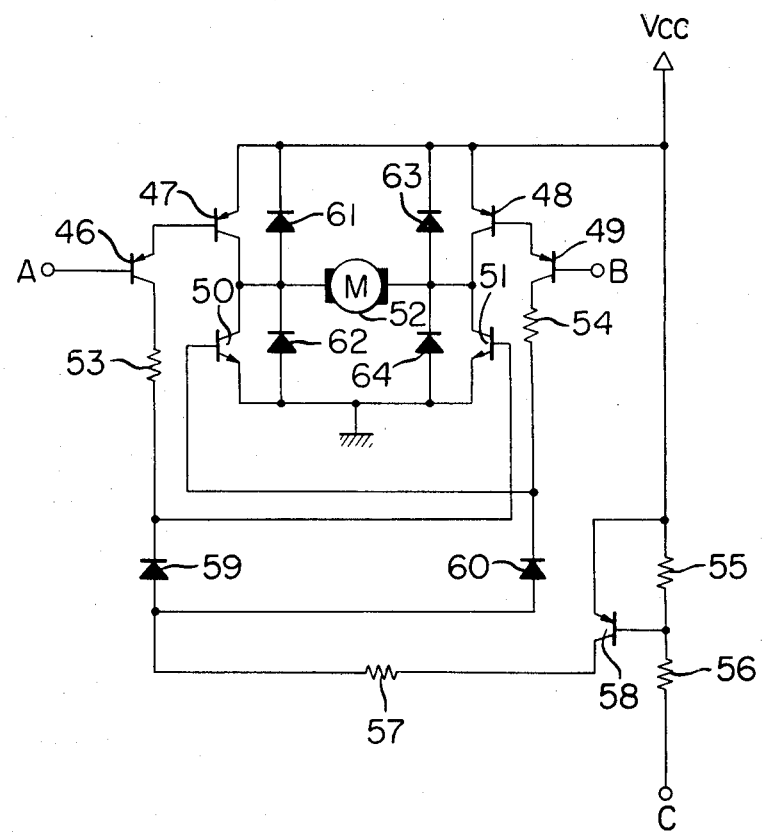
FIG. 5 is a circuit diagram of a motor driving device for driving the lens, which device is a part of the embodiment.

FIG. 5 shows a motor driving circuit used in an embodiment of the automatic focusing camera of the present invention.

This circuit includes a motor 52, PNP transistors 46, 47, 48, 49, 58 NPN transistors 50, 51, resistors 53, 54, 55, 56, 57, and diodes 59, 60, 61, 62, 63, 64.

The input terminals A, B and C of the motor control circuit shown in FIG. 5 are connected to the output terminals A, B and C, respectively, of the circuit of FIG. 4.

The operation of this motor driving circuit will hereinafter be described with respect to the front focus, the rear focus and the in-focus condition.

(1) The case of the front focus (1.a) When the phototaking lens lies outside the predetermined in-focus range and the object is bright:

At this time, a continuous Low level signal is applied as input to the input terminal A and a High level signal is applied as input to the input terminals B and C. By this Low level signal, the transistors 46, 47 and 51 are turned on and a current flows to the motor M from left to right through the transistors 47 and 51, so that the motor revolves in the normal direction and the phototaking lens is driven in a direction in which it is focused. Accordingly, when the phototaking lens lies outside the predetermined in-focus range and the object is bright, the motor M is driven towards in focus position continuously, namely, at high speed.

(1.b) When the phototaking lens lies within the predetermined in-focus range and the object is dark:

At this time, duty ratio 75% pulse signal is applied as input to the terminal A and a High level signal is applied as input to the input terminals B and C. When the terminal A is at Low level, transistors 46, 47 and 51 are turned on and therefore, the motor M is driven by a pulse current of duty ratio 25% and the driving speed becomes low.

(1.c) During the other time:

At this time, a pulse signal of duty ratio 50% is applied as input to the terminal A and the motor M is driven by a pulse current of duty ratio 50%, and the driving speed becomes an intermediate speed.

(2) The case of the rear focus (2.a) When the phototaking lens lies outside the in-focus range and the object is bright:

At this time, a Low level signal is continuously applied as input to the input terminal B and a High level signal is applied as input to the input terminals A and C. By this Low level signal, the transistors 48, 49 and 50 are turned on and a current flows to the motor M from right to left through the transistors 48 and 50, so that the motor revolves in the reverse direction. Accordingly, the lens is driven at high speed toward its in-focus point in the opposite direction to that in the case of the front focus.

(2.b) When the phototaking lens lies within the predetermined in-focus range and the object is dark:

A signal of duty ratio 75% is applied as input to the terminal B and therefore, the motor M is driven at low speed.

(2.c) During the other time:

A signal of duty ratio 50% is applied as input to the terminal B and therefore, the motor M is driven at intermediate speed.

(3) The case of the in-focus

A continuous Low level signal is applied as input to the input terminal C and a High level signal is applied as input to the input terminals A and B. By this Low level signal, the transistors 58, 50 and 51 are turned on and the motor 52 is short-circuited through the transistors 50 and 51 and suddenly stopped. When the focusing ring of the phototaking lens is manually rotated, the motor M is caused to revolve and thereby an electromotive force is created in the motor. The diodes 50–53 are for letting such electromotive force go to the outside of the circuit. The speed control conditions of the above-described motor M will be shown in Table 2 below.

TABLE 2

|  | Outside predetermined in-focus range | Within predetermined in-focus range | In-focus |
|---|---|---|---|
| Bright Object | High speed | Intermediate speed | Stopped |
| Dark Object | Intermediate speed | Low speed | Stopped |

In the present embodiment, when the phototaking lens lies outside the predetermined in-focus range and the object is dark, the lens driving speed has been the intermediate speed, but it may also be the high speed. The in-focus detecting device may be any one which can detect whether the phototaking lens lies within or outside the predetermined range near the in-focus position, for example, one which meters the other object light than the light passed through the phototaking lens and drives the phototaking lens to its in-focus position by the metering output and the position signal of the phototaking lens.

According to the present invention, as has been described above, the phototaking lens driving speed is controlled in accordance with the information as to whether the phototaking lens lies within or outside the predetermined in-focus range and the object brightness information and therefore, high focusing accuracy and quick focusing operation can be achieved.

We claim:

1. An automatic focusing apparatus for a camera, including:

(1) object brightness detecting means for detecting the brightness of an object and producing an output corresponding to the brightness;

(2) in-focus detecting means for detecting whether the phototaking lens of the camera lies within or outside a predetermined in-focus range near the in-focus position and producing outputs corresponding to the respective cases; and (3) phototaking lens driving means for driving said phototaking lens to its in-focus position in accordance with the output of said object brightness detecting means and the output of said in-focus detecting means, said phototaking lens driving means driving said phototaking lens at high speed when the object is of high brightness and the phototaking lens lies outside the predetermined in-focus range and at low speed when the object is of low brightness and the phototaking lens lies within the predetermined in-focus range.

2. An automatic focusing apparatus according to claim 1, wherein said phototaking lens driving means drives said phototaking lens at intermediate speed when the object is of high brightness and the phototaking lens lies within the predetermined in-focus range.

3. An automatic focusing apparatus according to claim 1, wherein said phototaking lens driving means drives said phototaking lens at one of intermediate speed and high speed when the object is of low brightness and the phototaking lens lies outside the predetermined in-focus range.

4. An automatic focusing apparatus according to claim 1, wherein said in-focus detecting means includes photoelectric elements and said object brightness detecting means detects the object brightness from the outputs of said photoelectric elements.

* * * * *